United States Patent
Mo et al.

(10) Patent No.: US 8,508,629 B2
(45) Date of Patent: *Aug. 13, 2013

(54) ANALOG ROW BLACK LEVEL CALIBRATION FOR CMOS IMAGE SENSOR

(71) Applicant: OmniVision Technologies, Inc., Santa Clara, CA (US)

(72) Inventors: Yaowu Mo, San Ramon, CA (US); Chen Xu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,851

(22) Filed: Jan. 8, 2013

(65) Prior Publication Data

US 2013/0120619 A1    May 16, 2013

Related U.S. Application Data

(63) Continuation of application No. 13/029,905, filed on Feb. 17, 2011, now Pat. No. 8,405,747.

(51) Int. Cl.
*H04N 9/64* (2006.01)
*G03F 3/08* (2006.01)

(52) U.S. Cl.
USPC .......................................... 348/245; 358/529

(58) Field of Classification Search
USPC ................................ 348/243, 251; 358/529
See application file for complete search history.

(56) References Cited

U.S. PATENT DOCUMENTS

| | | |
|---|---|---|
| 6,344,877 B1 | 2/2002 | Gowda et al. |
| 7,084,912 B2 | 8/2006 | Chieh |
| 8,144,215 B2 | 3/2012 | Lin |
| 8,310,569 B2 | 11/2012 | Willassen |
| 2003/0202111 A1 | 10/2003 | Park |
| 2005/0243193 A1 | 11/2005 | Gove et al. |
| 2008/0012966 A1 | 1/2008 | Beck et al. |
| 2008/0239111 A1 | 10/2008 | Jiang |
| 2009/0033779 A1 | 2/2009 | Mo |
| 2009/0273691 A1 | 11/2009 | Mo et al. |

(Continued)

OTHER PUBLICATIONS

U.S. Office Action mailed Oct. 26, 2012, U.S. Appl. No. 13/029,905, filed Feb. 17, 2011, 19 pages.

(Continued)

*Primary Examiner* — John Villecco
(74) *Attorney, Agent, or Firm* — Blakely Sokoloff Taylor & Zafman LLP

(57) ABSTRACT

A CMOS image sensor includes an image pixel array, a dark pixel array, data bit liens, reference bit lines, a driver, comparators, and analog-to-digital converter ("ADC") circuits. The image pixel array generates analog image signals in response to incident light. The dark pixel array generates analog black reference signals for analog black level calibration of the analog image signals. In one embodiment, the data bit lines each coupled to a different column of image pixels of the image pixel array and the reference bit lines each coupled to a different column of black reference pixels within the dark pixel array. The driver is coupled to the reference bit lines to drive an analog black reference signal. The comparators each couple to one of the data bit lines and each coupled to an output of the driver and offset the analog image signals with the analog black reference signals in an analog domain. The ADC circuits each coupled to an output of a comparator.

20 Claims, 8 Drawing Sheets

(56) References Cited

U.S. PATENT DOCUMENTS

| | | |
|---|---|---|
| 2010/0265368 A1 | 10/2010 | Yin |
| 2012/0212657 A1 | 8/2012 | Mo et al. |
| 2012/0249845 A1* | 10/2012 | Zheng et al. ............... 348/243 |

OTHER PUBLICATIONS

U.S. Notice of Allowance mailed Feb. 20, 2013, U.S. Appl. No. 13/029,905, filed Feb. 17, 2011, 17 pages.

* cited by examiner

ANALOG ROW BLACK LEVEL CALIBRATION FOR CMOS IMAGE SENSOR

CROSS-REFERENCE TO RELATED APPLICATIONS

The present application is a Continuation of U.S. patent application Ser. No. 13/029,905, filed on Feb. 17, 2011.

TECHNICAL FIELD

This disclosure relates generally to image sensors, and in particular but not exclusively, relates to black level calibration for CMOS image sensors.

BACKGROUND INFORMATION

Complementary metal-oxide-semiconductor ("CMOS") image sensors ("CIS") may generate inaccurate image data due to dark current in the pixels themselves and variation in the level of dark current from pixel to pixel. Each pixel of a CIS array provides an output voltage that varies as a function of the light incident on the pixel. Unfortunately, dark currents add to the output voltages and degrade the picture provided by the imaging system. To generate accurate image data, it is desirable to estimate dark current and level correct for it.

Most image sensors require some form of calibration before use so that the data obtained from the image sensor can be used to produce digital images that faithfully reproduce the optical characteristics (intensity, color, etc.) of the captured scene or object. Some calibrations can be carried out once and remain valid for every subsequent use of the image sensor, but other calibrations must be carried out for every single use of the image sensor. Black level calibration is one of the calibrations usually performed for every single use of an image sensor. As its name implies, the purpose of a black level calibration is to determine the black level of the image sensor. The black level calibration effectively sets a threshold below which digital data values obtained from the image sensor will be considered to represent the color black, or in other words, represent the absence or substantial absence of light. The threshold value is then used to adjust the values obtained from other pixels in the array. Accurate black-level calibration helps to achieve a digital picture with full contrast and subtle details in dark shadow regions. If the black level is too low, information in dark areas may be lost; if the black level is too high, signal range may be sacrificed.

Black level calibration is traditionally done with framewise subtraction of the current frame to a global dark row signal. This method removes dark current as well as the readout channel offset leaving just the image data. However, in situations where the dark current is not uniform across the pixel array, this method is less effective in obtaining black level calibration.

In frame exposure mode, the shutter and integration of a pixel array is done simultaneously across the entire pixel array. However, readout is done one row at a time, so there is an integration time difference from the top to the bottom of the pixel array. Non-uniformity of the dark current in frame exposure mode may cause vertical shading. Other causes of vertical shading include temperature gradients, process gradients, and pixel output settling.

Conventional black level calibration techniques are executed in the digital domain. One drawback of digital black level correction is that the image data loses its dynamic range after the digital subtraction operation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for an analog black level calibration of an image sensor are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
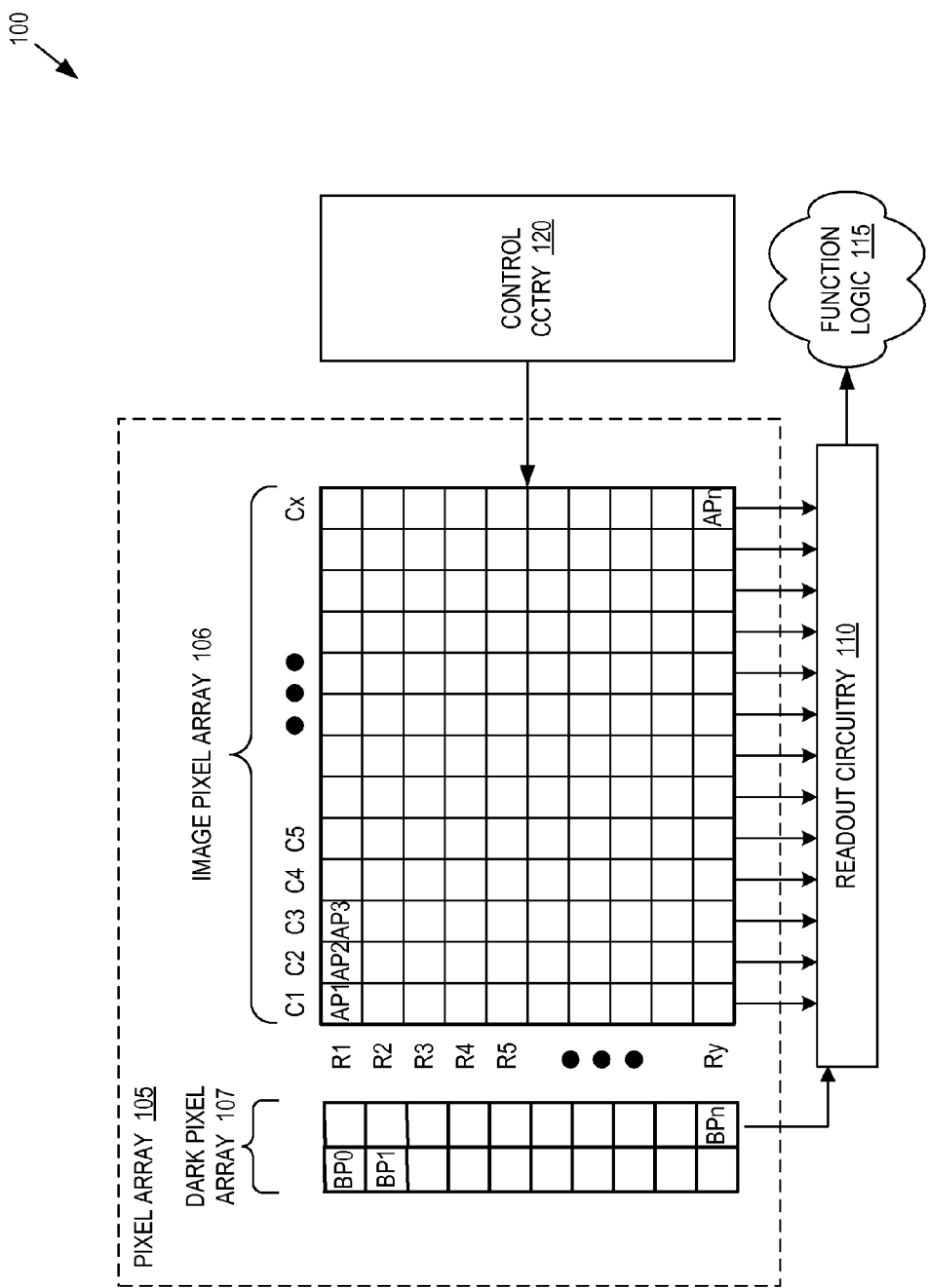
FIG. 1 is a function block diagram illustrating an image sensor, in accordance with an embodiment of the invention.

FIG. 1 is a functional bock diagram illustrating a complementary metal-oxide-semiconductor ("CMOS") image sensor 100, in accordance to an embodiment of the invention. The illustrated embodiment of CMOS image sensor 100 includes pixel array 105, readout circuitry 110, function logic 115, and control circuitry 120.

The illustrated embodiment of pixel array 105 includes a two-dimensional ("2D") image pixel array 106 and dark pixel array 107. Image pixel array 106 includes pixel cells (AP1, AP2, . . . , APn) for capturing image signals and dark pixel array 107 includes black reference pixel cells (e.g., BP0, BP1, ..., BPn) for capturing black level signals. In one embodiment, each pixel cell is an active pixel sensors ("APS"), such as a CMOS imaging pixel. In one embodiment, black reference pixels include similar or identical structure to their active pixel counterparts with at least one exception being that they are shielded from receiving light by a light blocking layer (e.g., photosensitive region covered over with metal). Of course, the black reference pixels may be implemented using other techniques.

As illustrated, each active pixel is arranged in a row (e.g., rows R1 to Ry) and a column (e.g., columns C1 to Cx) to acquire image data of a person, place or object which can then be used to render an image of the person, place or object. Pixel array 105 includes one or more black reference pixels (of dark pixel array 107) for outputting analog black reference signals that may be used to calibrate a black level set point for the pixels of image pixel array 106.

In the illustrate embodiment, pixel array 105 includes black reference pixels BP0 thru BPn aligned in two columns at the edge of image pixel array 106. Of course, dark pixel array 107 may include a significantly larger number of columns. Image pixel array 106 and dark pixel array 107 may share common rows. In the present embodiment, dark pixel array 107 includes two columns of black reference pixels formed along one side of image pixel array 106. In other embodiments, dark pixel array 107 may be formed in other regions of pixel array 105, such as the centre of pixel array 105, or even run along two opposing sides of image pixel array 106.

Readout circuitry 110 may include amplification circuitry, analog-to-digital conversion ("ADC") circuitry, black level calibration circuitry, image buffers, or otherwise. Function logic 115 can simply store the image data or even manipulate the image data by applying post image effects (e.g., crop, rotate, remove red eye, adjust brightness, adjust contrast, or otherwise). Control circuitry 120 is coupled to pixel array 105 to control operational characteristic of image pixel array 106 and even dark pixel array 107.

Figure 2:
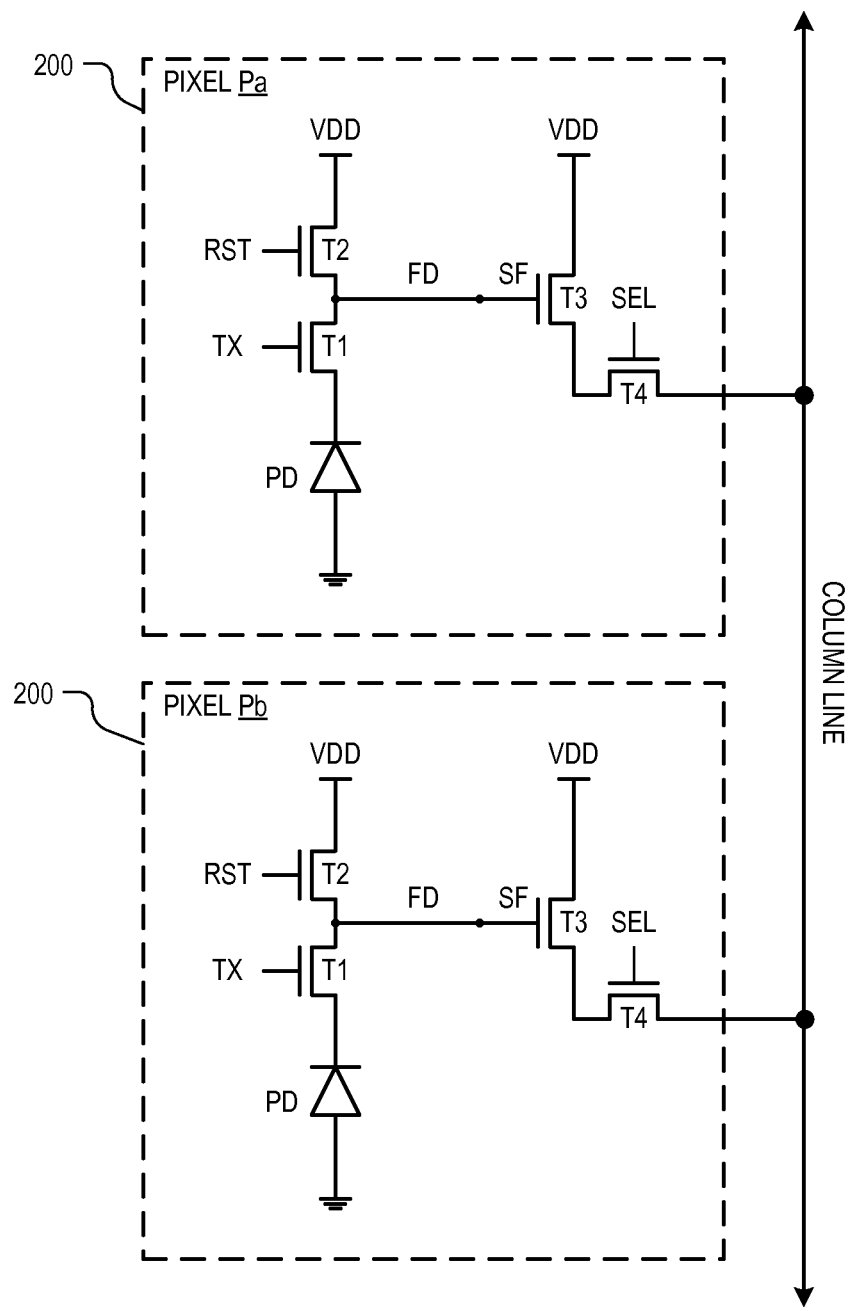
FIG. 2 is a circuit diagram illustrating pixel circuitry for two four-transistor ("4T") pixels within an embodiment of a pixel array.

FIG. 2 is a circuit diagram illustrating an embodiment of pixel circuitry 200 of two four-transistor ("4T") pixel cells, in accordance with an embodiment of the invention. Pixel circuitry 200 is one possible pixel circuitry architecture for implementing each pixel within pixel array 105 of FIG. 1, but it should be appreciated that embodiments of the present invention are not limited to 4T pixel architectures; rather, one of ordinary skill in the art having the benefit of the instant disclosure will understand that the present teachings are also applicable to 3T designs, 5T designs, and various other pixel architectures.

In FIG. 2, pixel cells Pa and Pb are arranged in two rows and one column. The illustrated embodiment of each pixel circuitry 200 includes a photodiode PD, a transfer transistor T1, a reset transistor T2, a source-follower ("SF") transistor T3, and a select transistor T4. During operation, transfer transistor T1 receives a transfer signal TX, which transfers the charge accumulated in photodiode PD, in response to incident light, to a floating diffusion node FD. In one embodiment, floating diffusion node FD can be coupled to a storage capacitor for temporarily storing image charges (not illustrated). Reset transistor T2 is coupled between a power rail VDD and the floating diffusion node FD to reset (e.g., discharge or charge the FD to a preset voltage) under control of a reset signal RST. The floating diffusion node FD is coupled to control the gate of SF transistor T3. SF transistor T3 is coupled between the power rail VDD and select transistor T4. SF transistor T3 operates as a source-follower providing a high impedance output from the pixel cell. Finally, select transistor T4 selectively couples the output of pixel circuitry 200 to the column readout line (also referred to as a bit line or data bit line) under control of a select signal SEL. The data readout from the pixel cell onto the bit line is an analog signal. In one embodiment, the TX signal, the RST signal, and the SEL signal are generated by control circuitry 120.

Figure 3:
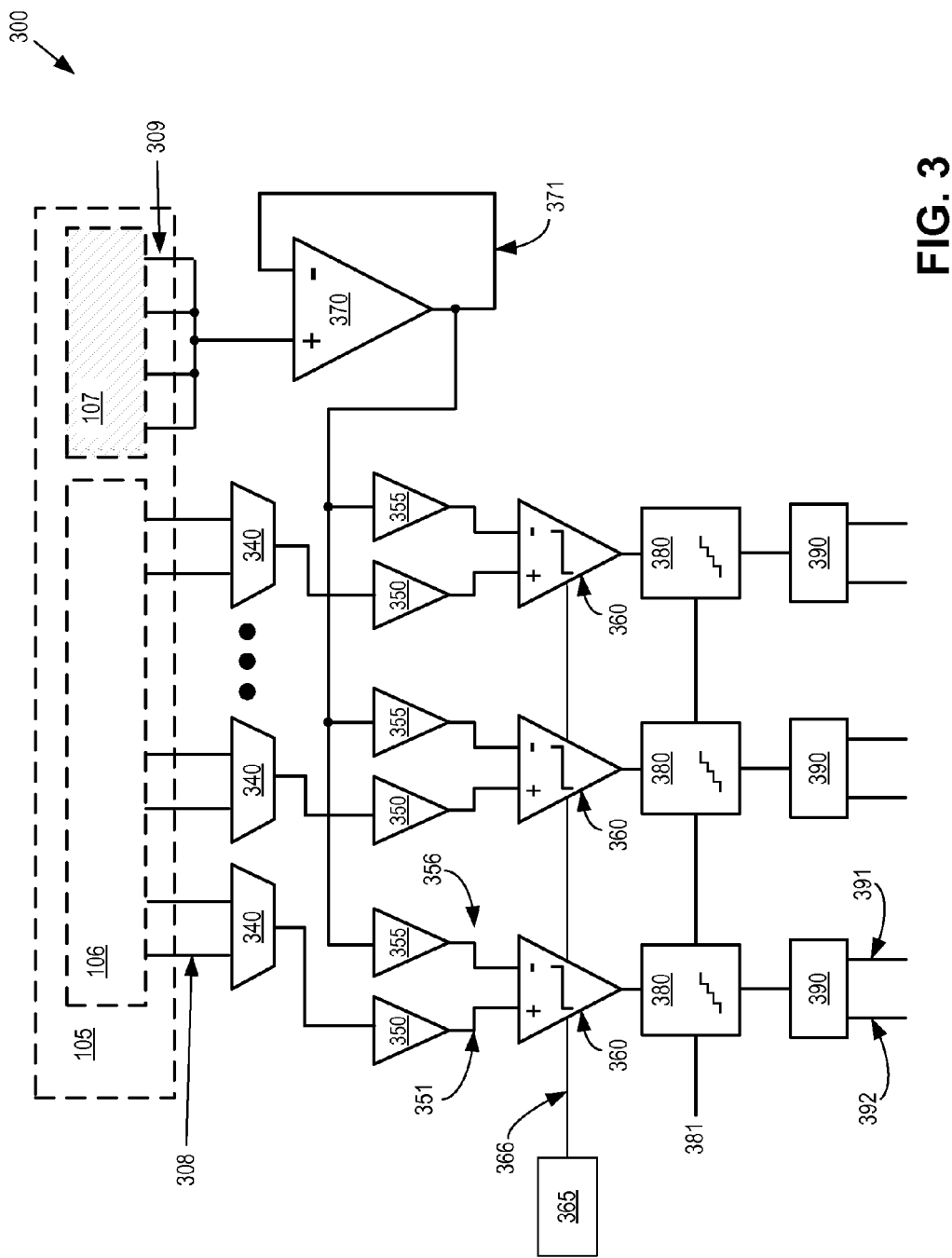
FIG. 3 is a functional block diagram illustrating readout circuitry that performs analog black level calibration, in accordance with an embodiment of the invention.

FIG. 3 is a functional block diagram illustrating readout circuitry 300 that performs analog black level calibration, in accordance with an embodiment of the invention. The illustrated embodiment of readout circuitry 300 includes data bit lines 308, reference bit lines 309, multiplexers 340, column amplifiers 350 and 355, a ramp comparator 360, ramp signal generators 365, a driver 370, a counters 380, and memories 390.

Each line (or column in the illustrated drawing) of image pixels in image pixel array 106 is coupled to a column readout line or data bit line 308 to read out the captured analog image signals. Similarly, each line (or column in the illustrated drawing) of black reference pixels in dark pixel array 107 is coupled a column readout line or reference bit line 309 to read out the analog black reference signals. Each bit line of pixel array 105 can be reset by asserting a reset signal to a column reset transistor (not shown). In the illustrated embodiment, two data bit lines 308 are multiplexed into a single column amplifier 350 using multiplexers 340. In other embodiments, each data bit line 308 can be coupled to its own column amplifier 350 (not illustrated) or greater than two data bit lines 308 can be multiplexed together (not illustrated).

In the illustrated embodiment, reference bit lines 309 output from dark pixel array 107 are short circuited together. In conventional black level calibration circuitry, a single black reference pixel is used to calibrate an entire row of an image pixel array. As such, a single defective pixel or hot pixel in a dark pixel row can cause the entire row to have an offset compared to the rest of the pixel array resulting in a row fixed pattern noise. In order to reduce the occurrence of this noise, embodiments of the present invention short circuit reference bit lines 309 of the dark pixel array together. This forms a minimum selector circuit that filters hot pixels and defective pixels. Since an entire row of black reference pixels is readout at a time and these analog black reference signals are short circuited together, the filtering is achieved as an averaging at the non-inverting input of driver 370. In one embodiment, each row of dark pixel arrays 107 corresponds to a row of image pixel array 106. In one embodiment, the position of each row of dark pixel array 107 is aligned with the corresponding row of image pixel array 106. Thus, as each row of analog image signals is readout from image pixel array 106, it is offset by an average (or filtered version) of the analog black reference signals output from a corresponding row of dark pixel array 107

Since reference bit lines 309 are short circuited together, these lines may be referred to as the common output of dark pixel array 107. In the embodiment of FIG. 3, the common output is coupled to a non-inverting input of driver 370. Driver 370 is provided to drive the capacitive load associated with column amplifiers 355. In one embodiment, driver 370 is implemented as a unit gain buffer having a non-inverting input coupled to the common output of dark pixel array 107 and an inverting input coupled to its output via a feedback path. The size of driver 370 is determined by the number of columns in image pixel array 106 and the capacitive load of each column of pixels (or column driver 355), to ensure that output signal 371 of driver 370 settles within a specified time (e.g., within 200 ns).

The analog image signals multiplexed from data bit lines 308 to respective column amplifiers 350 is amplified and coupled to the non-inverting input of ramp comparators 360. Similarly, the analog black reference signals are driven by driver 370, as output signal 371, amplified by column amplifiers 355 as analog black reference signals 356, which are coupled to the inverting input of ramp comparators 360. In one embodiment, column amplifiers 350, for amplifying analog image signals, are identical to column amplifiers 355 for amplifying the analog black reference signals (output signal 371).

During operation, ramp comparators 360 operate to offset the analog image signals 351 with the analog black reference signals 356 in the analog domain and then compare the offset analog image signals to a ramp signal 366 output from ramp signal generator 365. Ramp signal generator 365 generates ramp signal 366 that is coupled into ramp comparators 360. During operation of each ramp comparator 360, when the voltage of ramp signal 366 matches the offset analog image signal, the output of ramp comparator 360 toggles thereby notifying the corresponding counter 380. In one embodiment, counters 380 commence counting from a reset value at the same time that ramp signal 366 commences rising (or falling) from its reset value. Thus, each counter 380 counts how long it takes for ramp signal 366 to match each offset analog image signal. This count is then stored into memory 390 as a digital offset image value. Thus, counter 380 in cooperation with ramp signal generator 365 and the output stage of ramp comparator 360 collectively operate as a column analog-to-digital converter ("ADC"). Counters 380 are coupled to receive one or more control signals 381 (e.g., clock signal, reset), which may be generated in control circuitry 120.

Ramp comparator 360 operates to subtract out the dark current as well as row noise, as conveyed by the analog black reference signals, from the analog image signals. Since the analog black reference signals are readout on a row-by-row basis similar to the readout of the analog image signals, vertical shading of dark current is subtracted out. Digital correlated double sampling ("CDS") can then be performed at counter 380 to cancel out remaining noise. The outputs of counters 380 are coupled to memories 390 (e.g., static random access memory). A column decoder may then be coupled to memories 390 via read signals 391 and write signals 392 for ultimate readout off-chip from the image sensor.

In the illustrated embodiment, dark pixel array 107 includes four columns of black reference pixels formed along one side of pixel array 106. In other embodiments, dark pixel array 107 may include more or less columns of black reference pixels and may be formed in other regions of pixel array 305 such as the centre of pixel array 106 or along both sides of pixel array 106.

Figure 4:
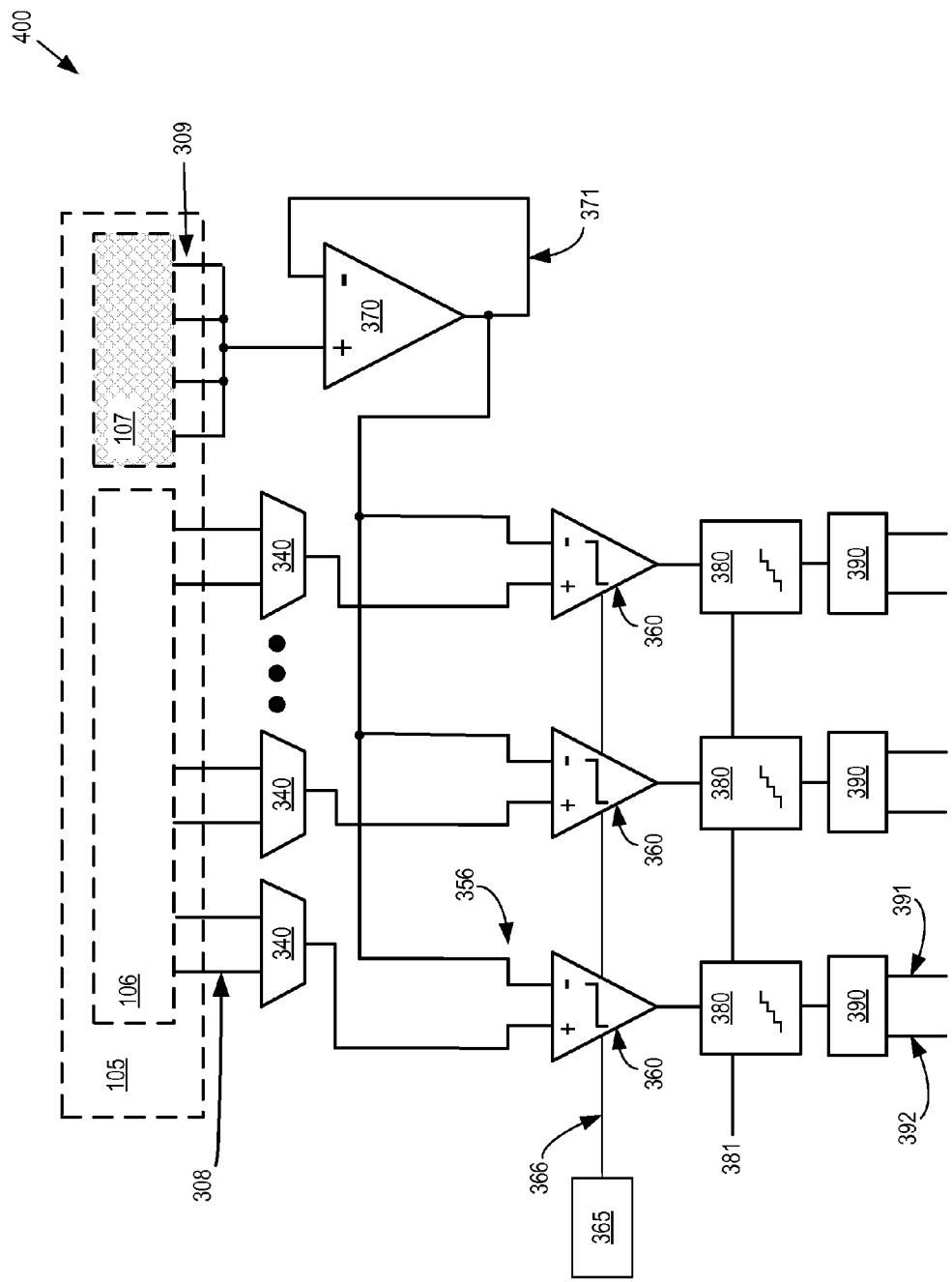
FIG. 4 is a functional block diagram illustrating readout circuitry that performs analog black level calibration while omitting column amplifiers, in accordance with an embodiment of the invention.

FIG. 4 is a functional block diagram illustrating readout circuitry 400 that performs analog black level calibration, while omitting column amplifiers, in accordance to an embodiment of the invention. The illustrated embodiment of readout circuitry 400 is similar to readout circuitry 300, except that column amplifiers 350 and 355 are omitted. In the illustrated embodiment, the outputs of multiplexers 340 are coupled directly to the non-inverting inputs of ramp comparators 360 and the output of driver 370 is coupled to the inverting input of ramp comparators 360. Column amplifiers 350 and 355 may be removed for a variety of reasons including low-end applications to save space and power consumption.

Figure 5:
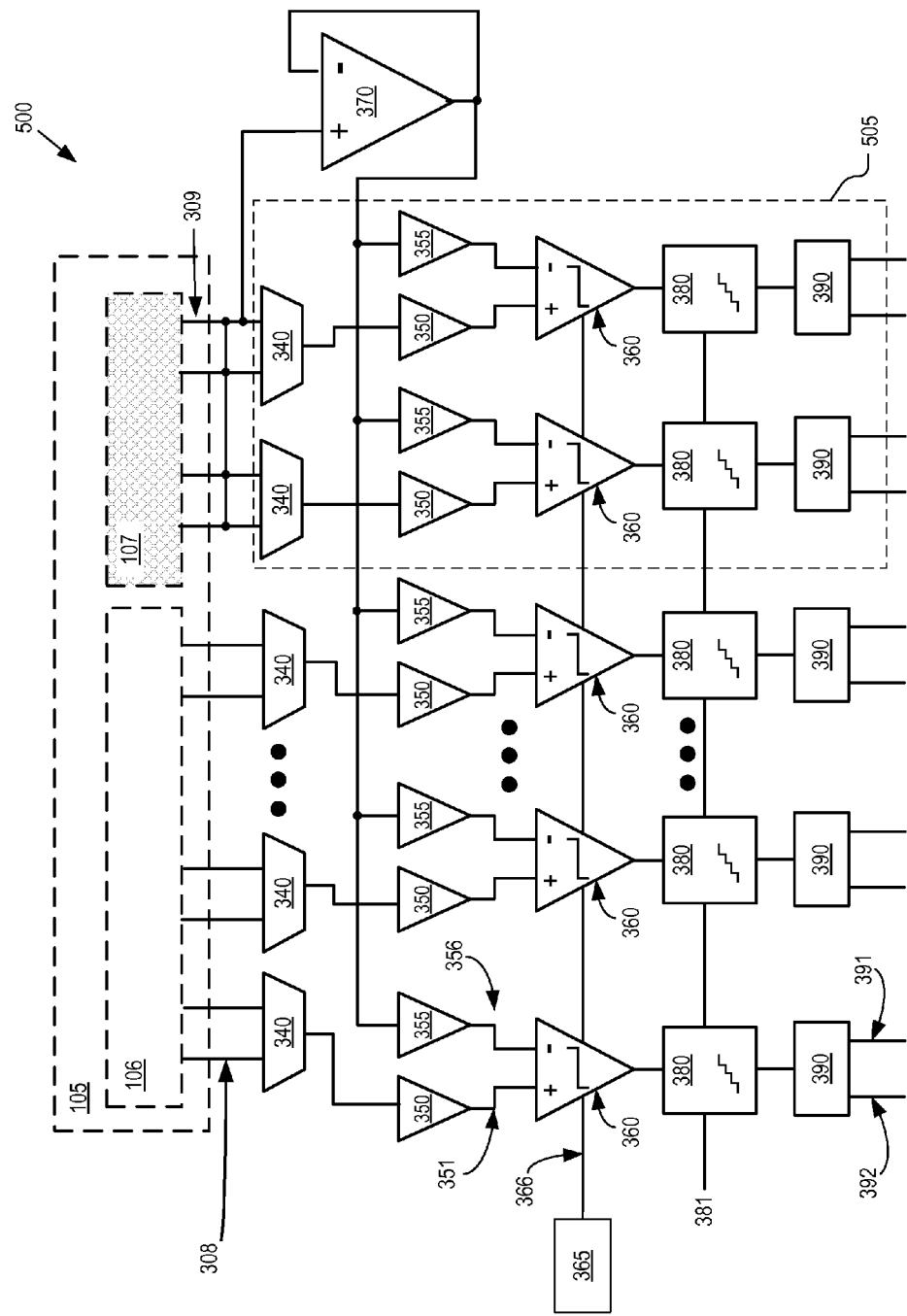
FIG. 5 is a functional block diagram illustrating readout circuitry that performs analog black level calibration and includes off-chip black reference readout circuitry, in accordance to with embodiment of the invention.

FIG. 5 is a functional block diagram illustrating readout circuitry 500 that performs analog black level calibration and includes off-chip black reference readout circuitry, in accordance to with embodiment of the invention. Readout circuitry 500 is similar to readout circuitry 300 with at least the following differences. Readout circuitry 500 includes off-chip black reference readout circuitry 505 coupled to reference bit lines 309 for off-chip readout of the individual black reference signals. The individual black reference signals can be useful for applications that apply digital correction algorithms on the acquired image in off-chip digital signal processing ("DSP").

Off-chip black reference readout circuitry 505 may be implemented with the same circuitry that is used to implement the readout circuitry coupled to image pixel array 106, with the exception that reference bit lines 309 are shorted circuited together at the input to multiplexers 340. Of course, in other embodiments, column amplifiers 350 and 355 within off-chip black reference readout circuitry 505 may also be omitted in a similar manner as illustrated in FIG. 4. This readout architecture requires more space and increases the power consumption relative to the embodiments of FIGS. 3 and 4, since the number of multiplexers 340, column amplifiers 350 and 355, ramp comparators 360, counters 380, and memory 390 is increased. However, this embodiment facilitates off-chip readout of digital black reference signals.

Figure 6:
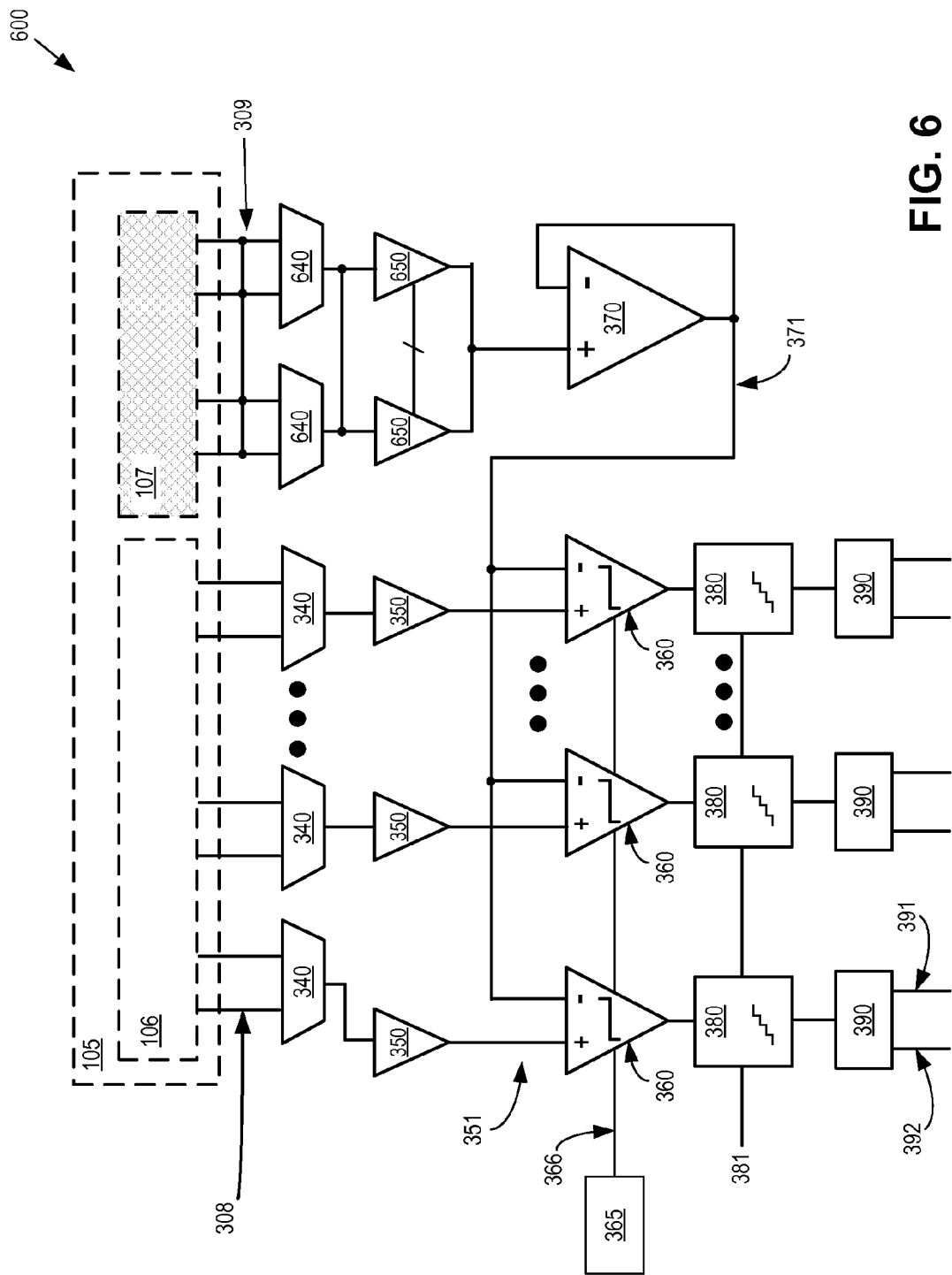
FIG. 6 is a functional block diagram illustrating readout circuitry that performs analog black level calibration with a reduced number of column amplifiers, in accordance with an embodiment of the invention.

FIG. 6 is a functional block diagram illustrating readout circuitry 600 that performs analog black level calibration with a reduced number of column amplifiers, in accordance with an embodiment of the invention. Readout circuitry 600 is similar to readout circuitry 300 with at least the following exceptions. Column amplifiers 355 are omitted and instead the output of driver 370 is coupled directly to the inverting input of ramp comparators 360. Omitting column amplifiers 355 saves space and power. In the illustrated embodiment, reference bit lines 309 are short circuited together and multiplexed using multiplexers 640. The analog black reference signals output from multiplexers 640 are also short circuited together before being coupled into column amplifiers 650. In one embodiment, column amplifiers 650 are coupled together using a technique referred to as "binning." Binning links or short circuits common nodes across column amplifiers 650 together. For example, the inputs, outputs, and one or more internal nodes are interlinked, respectively, amongst column amplifiers 650. Binning operates to more closely tie the column amplifiers together so that they collectively generate a consistent and averaged output, which is coupled to the non-inverting input of driver 370. Although FIG. 6 illustrates just six data bit lines and four reference bit lines, it should be appreciated that in practice hundreds or thousands of data bit lines and many more reference bit lines may be used.

Figure 7:
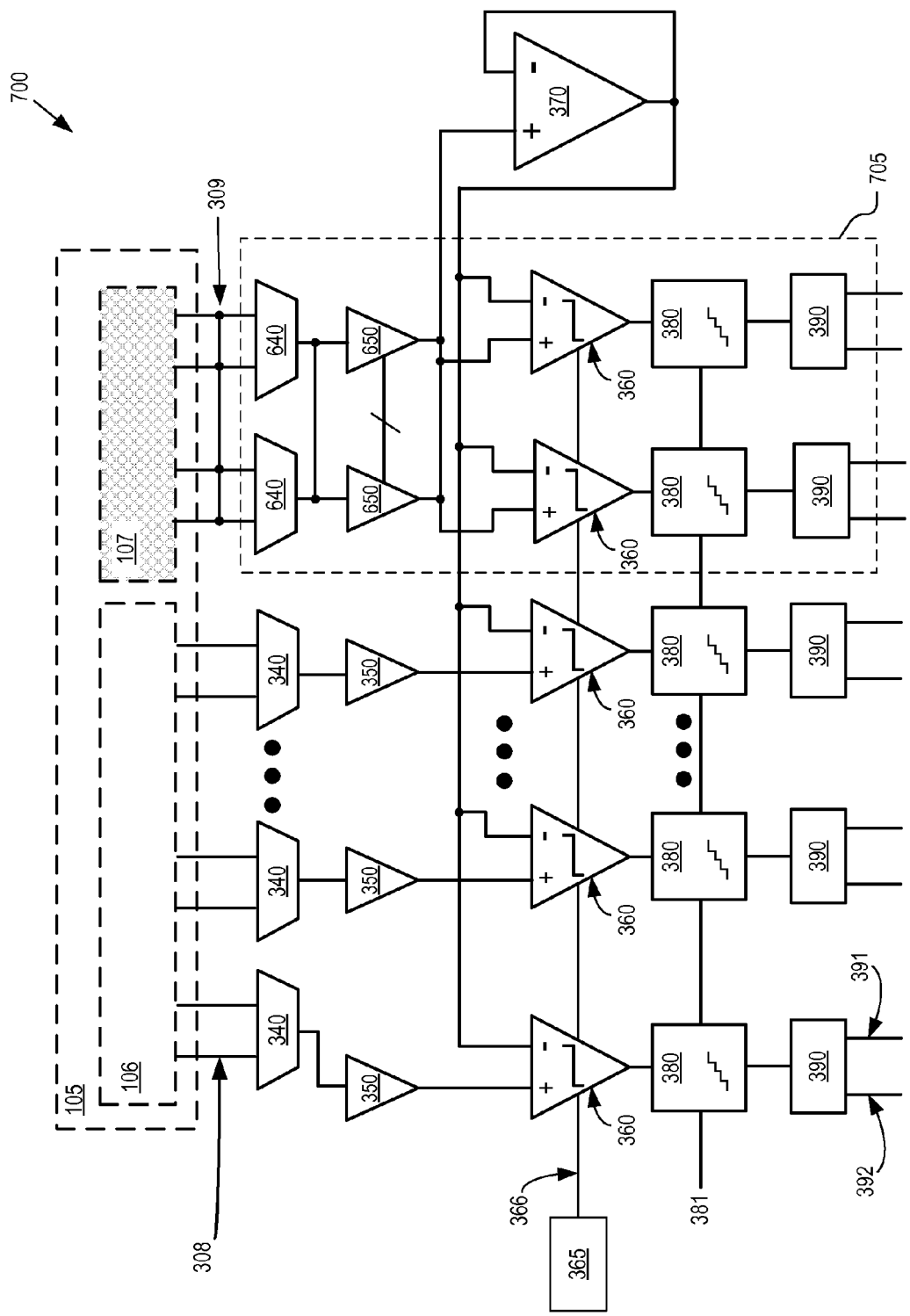
FIG. 7 is a functional block diagram illustrating readout circuitry that performs analog black level calibration with a reduced number of column amplifiers and off-chip black reference readout circuitry, in accordance with an embodiment of the invention.

FIG. 7 is a functional block diagram illustrating readout circuitry 700 that performs analog black level calibration with a reduced number of column amplifiers and off-chip black reference readout circuitry, in accordance with an embodiment of the invention. Readout circuitry 700 is similar to readout circuitry 600, but adds off-chip black reference readout circuitry 705. Off-chip black reference readout circuitry 705 operates in a similar manner to off-chip black reference readout circuitry 505 with the following exceptions. Column amplifiers 355 are omitted and instead column amplifiers 650 are tied together using the binning technique described above in connection with FIG. 6. Furthermore, the non-inverting input of driver 370 is coupled to the output of column amplifiers 650, instead of directly to reference bit lines 309.

Figure 8:
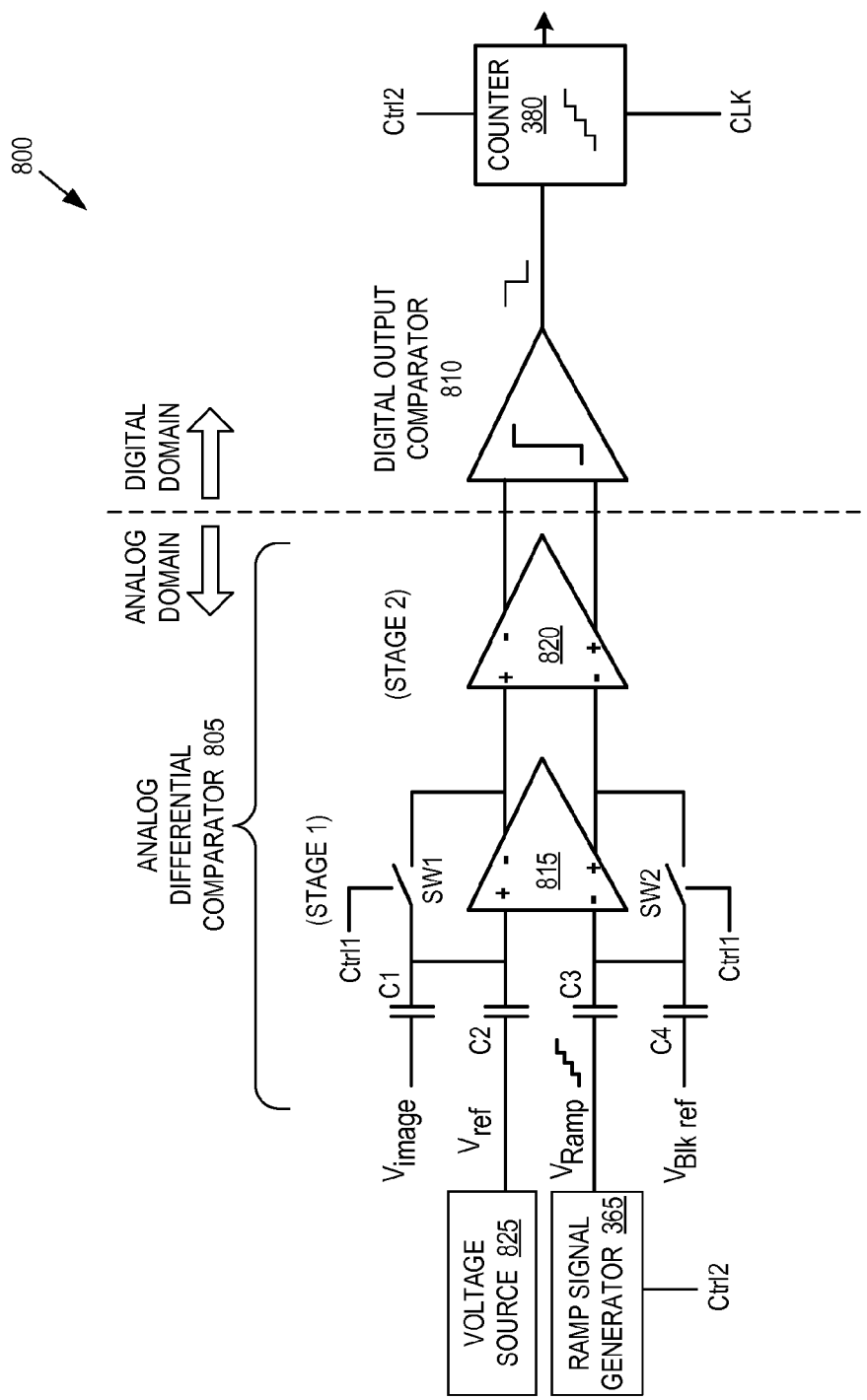
FIG. 8 is a functional block diagram illustrating a ramp comparator, in accordance with an embodiment of the invention.

FIG. 8 is a functional block diagram illustrating a ramp comparator 800, in accordance with an embodiment of the invention. Ramp comparator 800 is one possible implementation of ramp comparator 360 illustrated in FIGS. 3-7. The illustrated embodiment of ramp comparator 800 includes an analog differential comparator 805, a digital output comparator 810, input capacitors C1-C4, and switches SW1 and SW2. The illustrated embodiment of analog differential comparator 805 includes a first stage differential amplifier 815 and a second stage differential amplifier 820.

Ramp comparator 800 is a multistage comparator with a fully differential analog input (differential amplifier 815) and a single-ended digital output level shifter (digital output comparator 810). The non-inverting input of the first stage differential amplifier 815 is coupled via capacitor C1 to receive the analog image signal from image pixel array 106 and to receive a voltage reference from a voltage source 825 via a capacitor C2. The inverting input of the first stage differential amplifier 815 is coupled via capacitor C3 to receive ramp signal 366 from ramp signal generator 365 and to receive the analog black reference signal from dark pixel array 107 via capacitor C4.

The input to the first stage, including capacitors C1-C4, provides an auto-zeroing function to cancel the input offset. Since the analog data signal and analog black reference signal are connected to the positive and negative inputs of the first stage, respectively, a subtraction operation is performed in the analog domain between the two input signals. This subtraction operation is done in the analog domain through the capacitive coupling at the input of the first stage and has little or no effect on the common mode input and output voltage of analog differential comparator 805. Thus, there is little or no effect on the output swing of ramp comparator 800 and thus the dynamic range of the image sensor. Furthermore, the use of fully differential amplifiers 815 and 820 suppresses the common node noise, which prevents extra noise injection during the subtraction operation. The reference voltage output from voltage source 825 provides a mechanism to cancel out voltage source noise also using the differential properties of the first stage.

The ramp signal $V_{RAMP}$ output from ramp signal generator 365 is compared against the offset combination of $V_{IMAGE}$-$V_{BLK\_REF}$ and when they cross, the output of analog differential comparator 805 changes sign, causing digital output comparator to toggle or level shift. The value stored in counter 380 at the time of the level shift is used as the digital value corresponding to the analog image signal. During regular operation, control signal Ctrl1 operates to open circuit switches SW1 and SW2. Between digital-to-analog conversions, analog differential comparator 805 is reset for the next cycle by temporarily close circuiting switches SW1 and SW2 under control of Ctrl1. Similarly, counter 380 is reset under control of signal Ctrl2.

While FIG. 8 illustrates two stages of differential amplifiers, other embodiments of analog differential comparator 805 may include just a single stage or three or more stages of differential amplifiers to achieve the desired level of gain.

Embodiments of the present invention automatically cancel out dark current components from the analog image data on a row-by-row basis. This cancellation occurs prior to the gain stages within analog differential comparator 805. These characteristics can lead to a number of advantages including: a pre-gain correction provides a very wide correction range (e.g., potentially even higher than the full ADC range), no digital feedback is necessary, and row-wise correction facilitates correction of vertical shading (e.g., caused by frame exposure mode, temperature gradients within the die, etc.). The above filtering techniques applied to the reference bit lines also help reduce the susceptibility to black pixel noise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor, comprising:
an image pixel array to generate analog image signals in response to incident light;
a dark pixel array to generate analog black reference signals for analog black level calibration of the analog image signals;
a data bit line coupled to a line of image pixels within the image pixel array for transferring out the analog image signals from the line of image pixels;
a plurality of reference bit lines coupled to a corresponding plurality of lines of black reference pixels within the dark pixel array for transferring out the analog black reference signals from the lines of black reference pixels;
a driver coupled to the reference bit lines to receive the analog black reference signals;
a comparator coupled to receive the analog image signals from the data bit line and coupled to receive the analog black reference signals output from the driver, the comparator coupled to offset the analog image signals with the analog black reference signals in an analog domain; and
an analog-to-digital converter ("ADC") circuit coupled to an output of the comparator,
wherein the driver comprises a unit gain buffer including:
a non-inverting input coupled to the reference bit lines;
an inverting input; and
a feedback path coupling an output of the unit gain buffer to the inverting input.

2. The image sensor of claim 1, further comprising:
a plurality of data bit lines coupled to a corresponding plurality of lines of image pixels within the image pixel array; and
a plurality of comparators and corresponding ADC circuits each coupled to at least one of the data bit lines and to the driver to receive the analog black reference signals output from the driver.

3. The image sensor of claim 2, wherein the image pixels are arranged into columns and rows within the image pixel array and the black reference pixels are arranged into columns and rows within the dark pixel array, wherein the rows of the dark pixel array are aligned to the rows of the image pixel array.

4. The image sensor of claim 2, further comprising:
multiplexers each coupled to multiplex two or more of the data bit lines onto a single one of the comparators.

5. The image sensor of claim 4, further comprising:
a plurality of first line amplifiers each coupled between each of the multiplexers and the corresponding ones of the comparators.

6. The image sensor of claim 5, further comprising:
a plurality of second line amplifiers each coupled between the output of the driver and a corresponding one of the comparators.

7. The image sensor of claim 2, further comprising:
a plurality of line amplifiers each coupled between the reference bit lines and the driver, wherein the line amplifiers are binned together such that their inputs and outputs are shorted together an at least one common internal node within each of the line amplifiers is shorted together.

8. The image sensor of claim 2, further comprising:
off-chip black reference readout circuitry coupled to convert the analog black reference signals to digital black reference signals and to selectively output the digital black reference signals on a per column basis from the dark pixel array.

9. The image sensor of claim 1, wherein the plurality of reference bit lines are shorted together and coupled to an input of the driver.

10. The image sensor of claim 1, wherein the comparator comprises an analog differential amplifier having a non-inverting input coupled to receive the analog image signals and an inverting input coupled to receive the analog black reference signals.

11. The image sensor of claim 10, wherein the comparator further comprises a single-ended output comparator having two inputs coupled to differential outputs of the analog differential amplifier.

12. The image sensor of claim 11, wherein the ADC circuit includes a counter coupled to an output of the single-ended output comparator.

13. The image sensor of claim 10 further comprising a ramp signal generator coupled to provide a ramp signal to the inverting input of the analog differential amplifier.

14. A CMOS image sensor, comprising:
an image pixel array to generate analog image signals in response to incident light;
a dark pixel array disposed adjacent to the image pixel array to generate analog black reference signals for analog black level calibration of the analog image signals;
a plurality of data bit lines each coupled to a different column of image pixels within the image pixel array for transferring out the analog image signals;
a plurality of reference bit lines each coupled to a different column of black reference pixels within the dark pixel array for transferring out the analog black reference signals, wherein the reference bit lines are short circuited together;
a driver coupled to the reference bit lines to generate an average analog black reference signal;
a plurality of comparators each coupled to one of the data bit lines and each coupled to an output of the driver, the comparators coupled to offset the analog image signals with the average analog black reference signal in an analog domain; and
a plurality of analog-to-digital converter ("ADC") circuits each coupled to an output of a corresponding one of the comparators,
wherein the driver comprises a unit gain buffer including:
a non-inverting input coupled to the reference bit lines;
an inverting input; and
a feedback path coupling an output of the unit gain buffer to the inverting input.

15. The CMOS image sensor of claim 14, further comprising:
multiplexers each coupled to multiplex two or more of the data bit lines onto a single one of the comparators; and
a plurality of line amplifiers coupled between a corresponding one of the multiplexers and a corresponding one of the comparators.

16. The CMOS image sensor of claim 14, further comprising:
a plurality of line amplifiers coupled between the reference bit lines and the driver, wherein the line amplifiers are binned together such that their inputs and outputs are short circuited together an at least one common internal node within each of the line amplifiers is shorted together.

17. The CMOS image sensor of claim 14, further comprising:
off-chip black reference readout circuitry coupled to convert the analog black reference signals to digital black reference signals and to selectively output the digital black reference signals on a per column basis from the dark pixel array.

18. The CMOS image sensor of claim 14, wherein each of the comparators comprises an analog differential comparator having a non-inverting input coupled to receive a portion of the analog image signals and an inverting input coupled to receive the average analog black reference signal.

19. The CMOS image sensor of claim 18, wherein the comparator further comprises a single-ended output comparator having two inputs coupled to differential outputs of the analog differential comparator.

20. The image sensor of claim 19 further comprising:
a ramp signal generator coupled to provide a ramp signal to the inverting input of the analog differential amplifier;
a voltage source coupled to provide a reference voltage to the non-inverting input of the analog differential amplifier;
capacitors coupled between the inverting and non-inverting inputs of the analog differential amplifier and the analog image signals, the voltage source, the ramp signal generator, and the black reference signals;
a first switch coupled between the non-inverting input and a first output of a first stage of the analog differential comparator; and
a second switch coupled between the inverting input and a second output of the first stage of the analog differential comparator.

* * * * *